United States Patent Office 3,205,041
Patented Sept. 7, 1965

3,205,041
PROCESS FOR PRODUCING PURE YELLOW PHOSPHORUS SULFIDES
Joseph Cremer, Hermulheim, near Cologne, and Franz Rodis, Bad Hersfeld, Germany, assignors to Knapsack-Griesheim Aktiengesellschaft, Knapsack, near Cologne, Germany, a corporation of Germany
No Drawing. Filed Sept. 11, 1962, Ser. No. 222,936
Claims priority, application Germany, Sept. 15, 1961, K 44,721
10 Claims. (Cl. 23—206)

Phosphorus sulfides, such as $P_4S_3$, $P_4S_7$ or $P_2S_5$ are produced by reacting elementary phosphorus with sulfur. In order to mitigate the strongly exothermal reaction, particularly in laboratory methods, the more expensive red phosphorus can be employed. In industrial processes, so-called yellow phosphorus and sulfur are introduced as starting materials in stoichiometric quantities continuously or intermittently into a melt of phosphorus sulfides at temperatures of 200 to 500° C. After the cooling of the phosphorus-sulfide melt, the reaction products are ground to the desired particle size. These processes are carried out within the atmosphere of a protective gas. The resultant phosphorus sulfides are brown to dark brown products, in contradistinction to the pure yellow compounds.

In the literature, it is described that this dark color is caused by impurities in the starting substances and/or by the metals of the apparatus. One possible manner of converting these dark phosphorus sulfides subsequently into light-colored products is to distill them in vacuum or at normal pressure. In order to save additional costs of heating, the heat of reaction liberated is used for instance in a recent process to maintain the distilling off of the phosphorus sulfides during the reaction. However, in this method, too, the distillates have a grayish tint so that there is practically no absolute improvement, as compared with the original brown color.

Another known method of producing phosphorus sulfides of less dark coloration consists in introducing during the reaction or into the finished phosphorus-sulfide melt gases which contain oxygen, for instance air, in amounts of 1 to 10% of the phosphorus sulfides. Instead of air, oxides of boron, phosphorus, sulfur and nitrogen can also be added. In these cases, there is always produced, depending on the additions employed, a phosphorus sulfide of more or less light yellow appearance.

These methods involve a considerable additional expense in the manufacture and furthermore necessarily lead to reduced yields of pure material. These losses are produced first of all during distillation, for instance due to the occurrence of first runnings or of after runnings which, due to disproportionation of the phosphorus sulfides at the distillation temperatures of about 300° C. in vacuo and about 500° C. at atmospheric pressure, constitute substantial quantities, and secondly, upon the addition of for instance oxygen-containing gases to the phosphorus-pentasulfide melt, by the reaction:

$$P_4S_{10} + 3O_2 \rightarrow P_4S_4O_6 + 3S_2$$

i.e., by the formation of phosphorus trioxydisulfide. Furthermore, such impurities have a very disturbing effect on the further use of the phosphorus sulfides, for instance for the production of organo-phosphorus sulfides.

Upon a systematic investigation of the impurities present in the starting materials, it has now surprisingly been found that the light to dark brown coloration of the phosphorus sulfides is not caused by the inorganic foreign-elements or compounds in the phosphorus and sulfur, but especially by the organic impurities which may be contained predominantly in industrial so-called yellow phosphorus in amounts up to 1% by weight. As shown by a series of experiments, with a content of about 0.1% by weight to about 1% by weight of impurities of organic nature in the phosphorus used as starting material, the coloration of the resultant phosphorus sulfide increases in intensity from light yellow via brown to dark brown or grayish-black with an increase in the concentration of organic impurities. When using a yellow phosphorus with impurities of an organic nature of less than about 0.1% by weight, a light yellow final product is generally obtained.

This fact explains the initially incomprehensible poor effect of the distillation, while bearing in mind that during the distillation at the above indicated temperatures organic compounds may distill—over either decomposed or undecomposed, and thus again contaminate the distillate. On the other hand, it has proved superfluous to subject commercial grades of sulfur to further purification processes with the aim to free them from organic impurities, the minor effect produced by such further purification being but insignificant due to the extremely small proportion of organic impurities contained in such commercial grades of sulfur.

Yellow phosphorus can be purified, for instance, with dilute chromosulfuric acid or concentrated sulfuric acid. Pre-purification with polyphosphoric acid followed by treatment with activated carbon or activated-carbon/bleaching earth has proved a very effective, economical method which is easy to carry out. The so-called colorless phosphorus treated in this manner has a purity which is greater than 99.95% and thus meets the prerequisites for the production of pure yellow phosphorus sulfides. The impurity content of 0.05% covers both organic and inorganic compounds and/or elements, the latter representing always the smaller quantity, since they can be more easily removed by the known methods of purification. A purification of the phosphorus by steam distillation is practically without effect, since in this case, too, the predominant quantity of the organic compounds is found again in the distillate. The so-called colorless phosphorus substantially freed from organic compounds can be readily reacted in known manner with sulfur to form pure yellow phosphorus sulfides.

In other words, colorless phosphorus containing less than 0.2% by weight and preferably 0.1% by weight of organic impurities enables pure yellow phosphorus sulfides to be produced in maximum yields without the phosphorus sulfides being subjected to difficult and expensive distillation with its inherent losses of substance.

The phosphorus can be purified by all known processes which lead to a phosphorus containing less than 0.2% by weight and preferably 0.1% by weight organic impurities. It has been found very advantageous to pre-treat the phosphorus with polyphosphoric acid and then with activated carbon or with a mixture of activated carbon and bleaching earth.

More particularly, the process of the present invention for making pure, yellow phosphorus sulfides by reacting elementary yellow phosphorus with sulfur in the necessary stoichiometrical proportions at elevated temperatures, if desired in the atmosphere of a protective gas, and cooling is carried out while using phosphorus containing less than 0.2% by weight, preferably less than 0.1% by weight, of organic materials as the starting material. To this end, the phosphorus used may be pre-treated with an inorganic acid, for example, concentrated sulfuric acid, polyphosphoric acid or dilute chromosulfuric acid. After that acid pre-treatment, especially after the pre-treatment with polyphosphoric acid, the phosphorus may be further pre-treated with active carbon or with a mixture of active carbon and bleaching earth.

If sulfuric acid is used for the pre-treatment, the purification temperature is maintained within the range of about 50 to 80° C., advantageously 60 to 70° C.; if polyphosphoric acid is used for the pre-treatment, the purification temperature is maintained within the range of about 50 to 130° C., advantageously 80 to 100° C. The treatment with active carbon and/or bleaching earth is carried out while the phosphorus is in the molten state.

The phosphorus is then reacted with the sulfur at temperatures within the range of about 200 to 500° C. The protective gases under which the reaction is carried out include, for example, nitrogen, carbon dioxide, argon. After the reaction, the material obtained is cooled stepwise.

The following examples serve to illustrate the invention, but they are not intended to limit it thereto:

Example 1

Commercial phosphorus which was repeatedly purified with dilute chromosulfuric acid had a residual content of organic compounds of 0.3% by weight and of inorganic compounds of 0.04% by weight. This phosphorus was converted into phosphorus pentasulfide by introducing it into a sulfur melt in the corresponding stoichiometric ratio under a protective gas at temperatures of 20° to 500° C. During the strongly exothermal reaction, the temperature increased. The substantial completion of the reaction was recognized by the fact that the temperature remained constant for a prolonged time or began to decrease slightly. The yield was increased by allowing the reaction product to stand for 30 minutes before cooling it. The product obtained had a dirty brown coloration.

Example 2

Commercial phosphorus which was purified with concentrated sulfuric acid had a residual content of organic compounds of 0.15% by weight and of inorganic contaminants of 0.04% by weight. After completion of the reaction with molten sulfur as used in Example 1 and cooling, the phosphorus pentasulfide obtained had a light brown to yellow coloration.

Example 3

Commercial phosphorus which was repeatedly purified with concentrated sulfuric acid—with special precautionary measures—for instance, low temperature of purification within the range of about 60 to 70° C. and incomplete separation of the phosphorus—had a residual content of organic compounds of 0.08% by weight and of inorganic contaminants of 0.01% by weight. After reaction with a stoichiometric amount of sulfur, the material was cooled. The phosphorus sulfide obtained had a yellow coloration.

Example 4

Commercial phosphorus containing 0.6% by weight organic compounds was prepurified with polyphosphoric acid, and thereupon treated with a mixture of activated carbon and bleaching earth. The residual content of organic compounds was 0.05% by weight and of inorganic compounds <0.01% by weight. The phosphorus so treated was reacted with sulfur and yielded phosphorus pentasulfide having a light yellow coloration.

We claim:

1. A process for the manufacture of pure phosphorus sulfides by reacting elementary yellow phosphorus at elevated temperatures with sulfur and cooling the resulting reaction product, which comprises pretreating the said phosphorus with a member selected from the group consisting of concentrated sulfuric acid, polyphosphoric acid and dilute chromosulfuric acid, the pretreatment resulting in the formation of phosphorus containing less than 0.2% by weight organic impurities, and reacting the phosphorus so pretreated with the said sulfur with the resulting formation of pure yellow phosphorus sulfides.

2. A process as claimed in claim 1, wherein the phosphorus used contains less than 0.1% by weight organic impurities.

3. A process as claimed in claim 1, wherein the phosphorus is pre-treated and thereby purified with sulfuric acid at a temperature within the range of about 50 to 80° C.

4. A process as claimed in claim 3, wherein the phosphorus is pre-treated at a temperature within the range of 60 to 70° C.

5. A process as claimed in claim 1, wherein the phosphorus is pre-treated and thereby purified with polyphosphoric acid at a temperature within the range of about 50 to 130° C.

6. A process as claimed in claim 5, wherein the phosphorus is pre-treated at a temperature within the range of 80 to 100° C.

7. A process as claimed in claim 1, wherein the phosphorus is reacted with sulfur at a temperature within the range of about 20° and 500° C.

8. A process as claimed in claim 1, wherein the reaction product obtained is cooled stepwise to room temperature.

9. A process as claimed in claim 1, wherein the pretreated phosphorus is molten and further pretreated with a member selected from the group consisting of active carbon, bleaching earth and mixtures thereof.

10. A process as claimed in claim 1, wherein the phosphorus is reacted with the sulfur in the presence of one inert gas selected from the group consisting of nitrogen, carbon dioxide and argon.

References Cited by the Examiner

UNITED STATES PATENTS

| | | | |
|---|---|---|---|
| 2,569,128 | 9/51 | Jones | 23—206 |
| 2,794,705 | 6/57 | Hudson | 23—206 |
| 2,824,788 | 2/58 | Lefforge | 23—206 |

MAURICE A. BRINDISI, *Primary Examiner.*